(12) United States Patent
Dong

(10) Patent No.: US 8,489,143 B2
(45) Date of Patent: Jul. 16, 2013

(54) ME NETWORK PARAMETERS CONFIGURATION BY UICC

(75) Inventor: Olivier Dong, Berkshire (GB)

(73) Assignee: NEC Corporation, Tokyo (JP)

( * ) Notice: Subject to any disclaimer, the term of this patent is extended or adjusted under 35 U.S.C. 154(b) by 49 days.

(21) Appl. No.: 13/148,434

(22) PCT Filed: Jan. 15, 2010

(86) PCT No.: PCT/JP2010/050854
§ 371 (c)(1),
(2), (4) Date: Aug. 8, 2011

(87) PCT Pub. No.: WO2010/092866
PCT Pub. Date: Aug. 19, 2010

(65) Prior Publication Data
US 2011/0319133 A1    Dec. 29, 2011

(30) Foreign Application Priority Data
Feb. 10, 2009  (GB) .................................. 0902154.4

(51) Int. Cl.
*H04B 1/38* (2006.01)
*H04M 3/00* (2006.01)

(52) U.S. Cl.
USPC ........................... 455/558; 455/418; 455/420

(58) Field of Classification Search
USPC ........................................ 455/558, 418, 420
See application file for complete search history.

(56) References Cited

U.S. PATENT DOCUMENTS

| 2002/0165008 A1 | 11/2002 | Sashihara et al. |
| 2005/0059385 A1* | 3/2005 | Twigg et al. .................. 455/418 |
| 2005/0141438 A1 | 6/2005 | Quetglas et al. |
| 2008/0009318 A1* | 1/2008 | Evans ........................... 455/558 |
| 2008/0220773 A1 | 9/2008 | Buckley |
| 2009/0132806 A1 | 5/2009 | Blommaert et al. |

FOREIGN PATENT DOCUMENTS

| EP | 1424860 A2 | 6/2004 |
| EP | 2 028 910 A1 | 2/2009 |
| JP | 2002-300254 A | 10/2002 |
| JP | 2003-324768 A | 11/2003 |

(Continued)

OTHER PUBLICATIONS

"Smart Cards; Card Application Toolkit (CAT) (Release 8)", ETSI TS 102 223, V8.1.0, Technical Specification, Oct. 2008, pp. 1-201.

(Continued)

*Primary Examiner* — Kamran Afshar
*Assistant Examiner* — Omoniyi Obayanju
(74) *Attorney, Agent, or Firm* — Sughrue Mion, PLLC

(57) ABSTRACT

A mobile device is provided having a smart card. The smart card is programmed to generate a new configure command that can be used to configure network related parameters within the mobile device. The configure command can be used to override existing network related parameters or to add additional network related parameters. The network related parameters may relate to different access points and an identifier may be associated with each set of network parameters to facilitate the subsequent identification of desired network related parameters.

12 Claims, 4 Drawing Sheets

FOREIGN PATENT DOCUMENTS

| | | |
|---|---|---|
| JP | 2008-109658 A | 5/2008 |
| JP | 2008-546333 A | 12/2008 |
| WO | WO 03046742 A1 | 6/2003 |
| WO | 2008/060208 A1 | 5/2008 |

OTHER PUBLICATIONS

"Smart Cards; UICC-Terminal interface; Characteristics of the USB interface (Release 7)", ETSI TS 102 600, V7.4.0, Technical Specification, Jan. 2009, pp. 1-24.

"Smart Cards; UICC-Terminal interface; Physical and logical characteristics (Release 7)", ETSI TS 102 221 V.7.13.0, Technical Specification, Jan. 2009, pp. 2-174.

Office Action issued on May 29, 2009 in the corresponding British Patent Application No. GB0902154.4.

Communication dated Sep. 27, 2012, issued by the Korean Intellectual Property Office in counterpart Korean Patent Application No. 10-2011-7018438.

* cited by examiner

ME NETWORK PARAMETERS CONFIGURATION BY UICC

CROSS REFERENCE TO RELATED APPLICATION

This application is a National Stage of International Application No. PCT/JP2010/050854 filed Jan. 15, 2010, claiming priority based on United Kingdom Patent Application No. 0902154.4, filed Feb. 10, 2009, the contents of all of which are incorporated herein by reference in their entirety.

PRIORITY CLAIM

Priority is claimed on United Kingdom Patent Application No. 0902154.4, filed Feb. 10, 2009, the content of which is incorporated herein by reference.

TECHNICAL FIELD

The present invention relates to communications equipment and in particular to mobile equipment (ME) having a Universal Integrated Circuit Card (UICC) therein and the way in which software applications can run on the UICC and interact with the ME. The invention also relates to the mobile equipment, the UICC and to the methods performed therein.

BACKGROUND ART

MEs such as mobile telephones include a UICC which, among other things, holds secure data for identifying the user to the core network. The UICC is a smart card that has an inbuilt microprocessor and memory that can run a number of software applications. Typically the network operators have the possibility to set some default network related parameters in the mobile handsets before they are released to the market. One set of these parameters is related to the network access point on the network side to which the mobile handset has to connect in order to establish a packet connection for ME or UICC software applications (Browser, data download from an operator server, etc).

The standards setting Organization ETSI is in the process of finalizing Release 7 (Rel-7) of its standards documents (including TS 102 221, TS 102 600 and TS 102 223) relating to the interaction between the ME and its UICC. Prior to Rel-7, most network operators usually only had one access point for all UICC applications. However, from Rel-7 onwards, things have been radically changed with the definition of the USB high speed ME-UICC interface and the support of TCP/IP stacks in the UICC. These new features have opened up new business opportunities for network operators who can now extend the number of value-added software applications (residing in the UICC) proposed to the end user. Naturally many of these UICC software applications will interact with the operator network. Currently this may be done using one of two approaches:

- The UICC application does not specify any access point parameters when it passes the relevant proactive command (typically a Launch Browser or an Open Channel command) to the ME. In this case, the ME will connect to the default access point using its predefined default parameters stored in the ME.
- The UICC application does specify parameters for an access point in the relevant proactive command to the ME. In this case, the ME will use these parameters to connect to the indicated access point.

The first approach is only applicable when the UICC application wants to connect to the default access point. The inventor has realized that this is likely to have limited utility as network operators are likely to provide different access points for different services and therefore, the second approach is more likely to be used. However, the second approach is relatively cumbersome as the UICC has to send the parameters for the desired access point with every proactive command and the ME has to interpret those parameters in each command.

DISCLOSURE OF INVENTION

In order to address this problem, the inventor has proposed that a new command (interface) be provided that will allow the UICC to (re)configure dynamically network operator related parameters (such as the network access name, login, password etc) within the ME. This will provide more flexibility for operator applications residing in the UICC and will reduce the processing of all network related proactive commands in both the UICC and the ME.

According to one aspect, the present invention provides a mobile device comprising: a UICC interface for interfacing with a UICC; a memory for storing network access data for use in connecting to a remote access point; a UICC module operable to communicate with said UICC via said UICC interface; and transceiver circuitry operable to transmit and receive signals for connecting to said remote access point using said stored network access data; wherein said UICC module is operable to receive a configure command from said UICC via said UICC interface, the configure command including new network access data for a remote access point and wherein the UICC module is operable, in response to receiving said configure command, to store the new network access data in said memory for use in connecting to the remote access point corresponding to the new network access data. The mobile device may use the thus stored network access data to connect to a remote access point in response to a subsequent command received from the UICC or from an application on the mobile device. In a preferred embodiment, the new network access data is stored in non-volatile memory so that it is maintained in the mobile device after being powered down or reset.

In one embodiment, the UICC module stores the new network access data in the memory in place of existing network access data. In another embodiment, the UICC module stores the new network access data in the memory in addition to existing network access data. In the latter case, the new network access data may include login data and a unique identifier for distinguishing the new network access data from other network access data stored in the memory. The unique identifier may be separate from the login data required for connecting to the access point and is not part of the data transmitted to the network when logging in to the access point. It is preferably an internal identifier used by the UICC and the mobile device.

By configuring the memory with this new network access data, subsequent commands issued by the UICC do not need to include the network access data for a connection to be made to the desired access point. Where network access data is stored for multiple access points, the subsequent commands only need to include the identifier to identify the desired access point and hence the network access point data to be retrieved from memory. The further command may be, for example, a Launch Browser command or an Open Channel command.

The present invention also provides a UICC comprising: an interface for interfacing with a mobile device; a memory for storing network access data for use by the mobile device to connect to a remote access point; and a USAT module operable to communicate with the mobile device; wherein the USAT module is operable to generate a configure command including the stored network access data and to pass the generated configure command to the mobile device and wherein the configure command is different from any command used to request a connection to a remote access point and is for causing the mobile device to store the network access data for use in connecting to a remote access point in response to a subsequent command generated by the USAT module. The configure command preferably causes the mobile device only to store the new network access data.

In one embodiment, the USAT module generates a configure command that includes login data for the remote access point and an identifier associated with the access point. This allows different network access data to be stored within the memory of the mobile device whilst allowing the different network access data to be distinguished from each other. In this case, the UICC preferably maintains information (such as a table) identifying the access points for which the network access point data has been sent in one or more configure commands to the mobile device. The UICC can then check the maintained information before generating a configure command for new network access data, and only generates the configure command if the network access data has not already been passed to the mobile device for storage therein. In this way, duplicate configure commands can be avoided.

In one embodiment, the UICC generates a further command and passes the further command to the mobile device, the further command requiring access to the network and including the identifier without the login data. The further command may be a Launch Browser command or an Open Channel command. In this way, once the mobile device has been configured with the network access point data, subsequent commands that require access to a specific access point can be sent without the login information for that access point. Instead, the mobile device can retrieve this information from its memory using the identifier included in the subsequent commands.

The present invention also provides a UICC proactive command comprising network access parameters associated with a remote access point and command type data identifying the command as a configure command that causes a mobile device that receives the command to store the network access parameters for use in connecting to a remote access point in response to a subsequent proactive command that may require access to the network.

The present invention also provides corresponding methods and computer implementable instruction products. The computer implementable instructions may be stored on a recording medium such as a CD-ROM or the like.

BRIEF DESCRIPTION OF THE DRAWINGS

These and other aspects of the invention will become apparent from the following detailed description of exemplary embodiments described with reference to the accompanying drawings in which.

BEST MODE FOR CARRYING OUT THE INVENTION

First Embodiment

Overview

As will be explained in more detail below, the main idea of this embodiment is to create a new interface allowing the UICC to (re)configure dynamically some parameters in the ME, in particular operator network related parameters (network access name, login, password, . . . ) in order to provide more flexibility for operator applications residing in the UICC and optimize the processing of all network related proactive commands in both the UICC and the ME.

Figure 1:
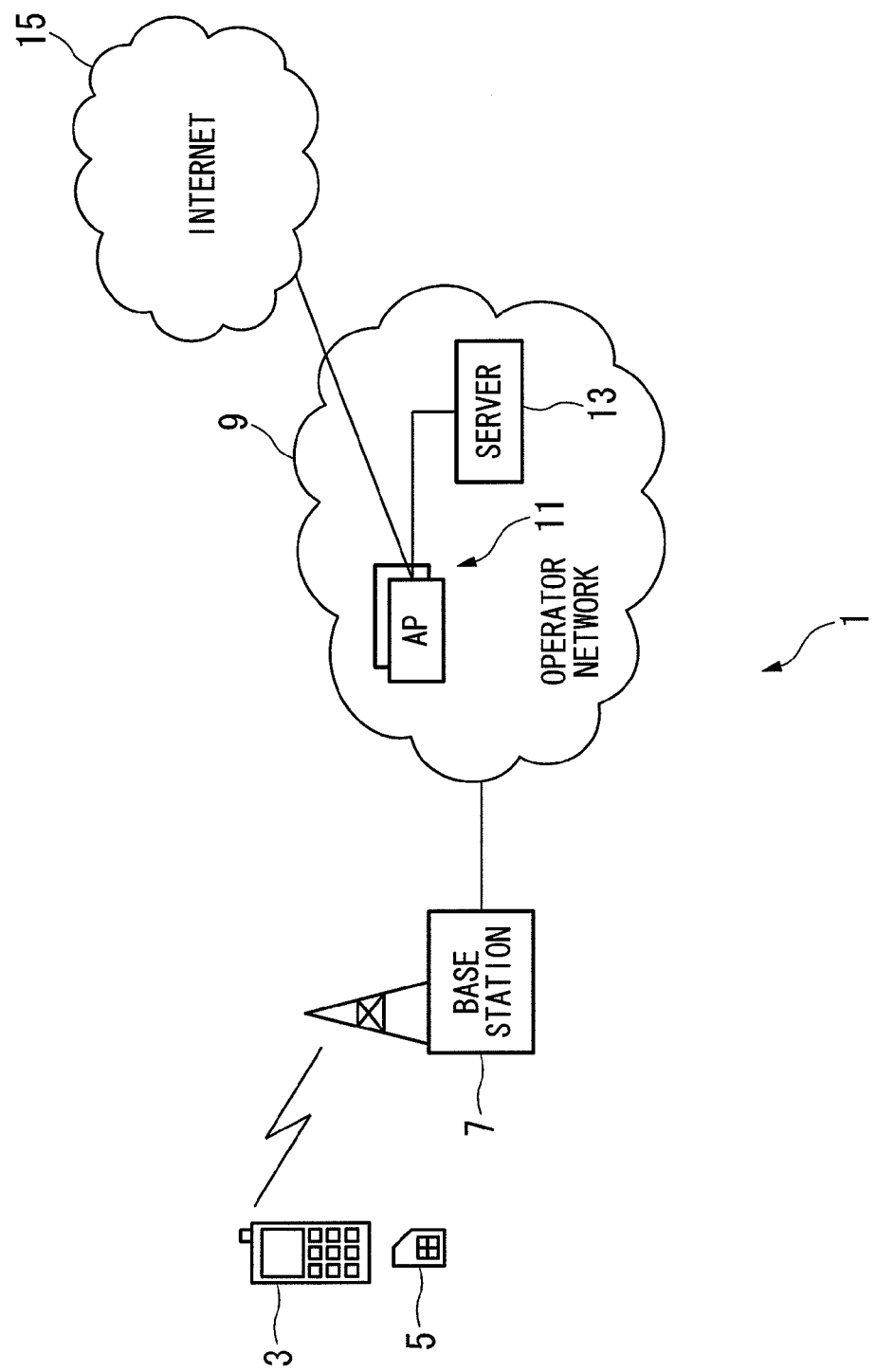
FIG. 1 is a block diagram illustrating the main components of a mobile communications system having a single access point.

FIG. 1 is a block diagram showing the main components of a mobile communications system 1. As shown, the system includes mobile equipment (ME) 3, such as a cellular telephone; a UICC 5 that is normally mounted within the ME 3; a base station 7 for transmitting signals to and for receiving signals from the ME 3; and an operator network 9 that provides data and voice call services to the ME 3. As shown, the operator network 9 includes a number of access points 11 to which the ME 3 connects to gain access to servers 13 in the operator network 9 or servers (not shown) in the Internet 15. One access point 11 will be a default access point; one may be provided specifically for Web applications; another for download applications, another for MMS applications, etc.

Figure 2:
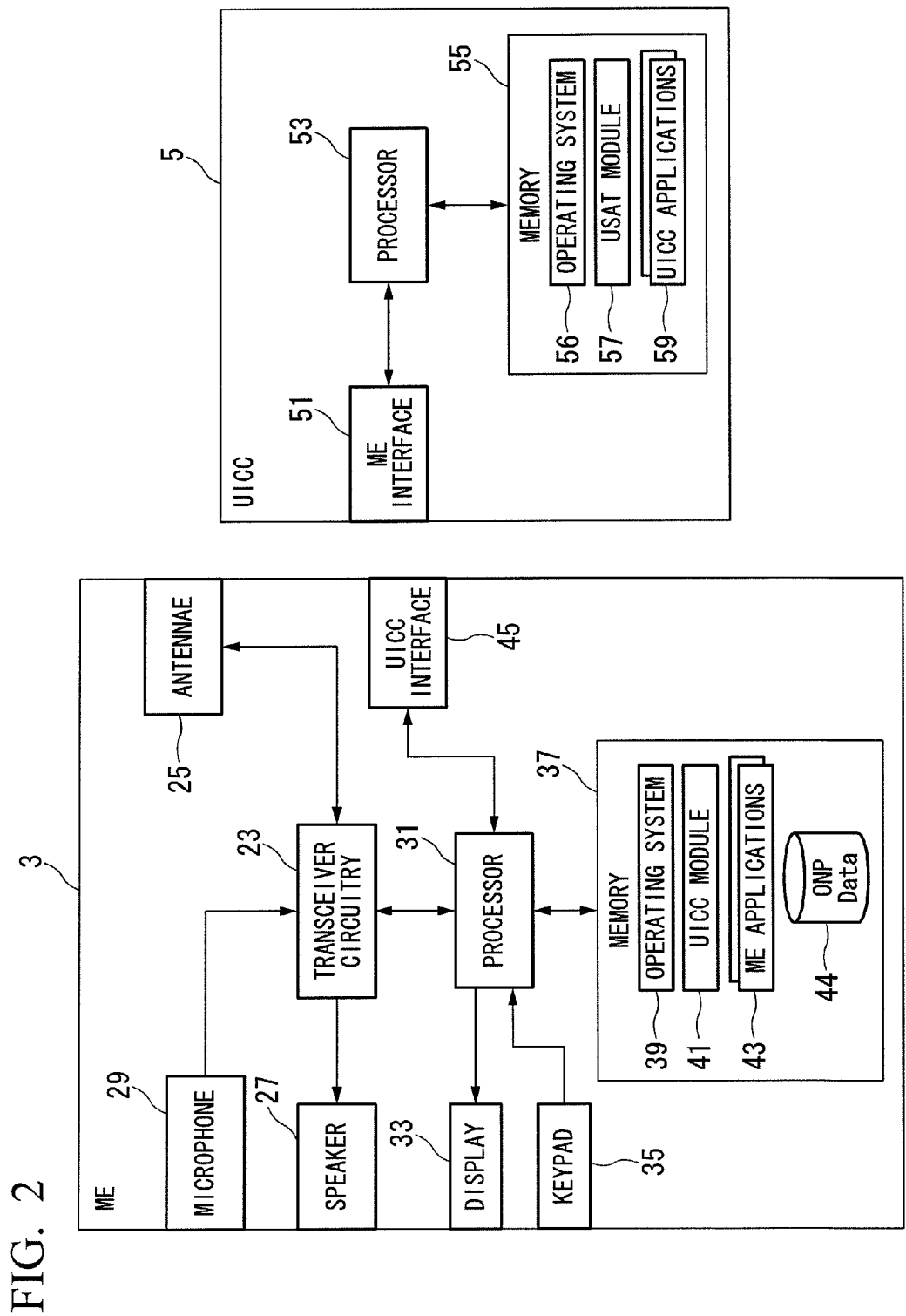
FIG. 2 is a block diagram illustrating the main components of a ME and a UICC forming part of the system shown in FIG. 1.

FIG. 2 is a block diagram showing the main components of the ME 3 and the UICC 5 used in this embodiment. As shown, the ME 3 includes transceiver circuitry 23 which is operable to transmit signals to and to receive signals from the base station 7 via one or more antennae 25. As shown, the transceiver circuitry 23 is connected to a loudspeaker 27 and a microphone 29 in the normal way to allow the user to make and receive calls. The ME 3 also includes a processor 31 for controlling the operation of the ME 3 and for controlling the user interaction with the ME via display 33 and keypad 35. The processor 31 operates in accordance with software instructions stored within memory 37. As shown, these software instructions include, among other things, an operating system 39; a UICC module 41 for controlling the interaction between the ME 3 and the UICC 5; and a number of ME applications 43. A non-volatile portion of the memory 37 also stores data used by the various software modules, including Operator Network Parameter (ONP) data 44. The ONP data 44 includes the network parameters for connecting to the different access points 11. The ME 3 also includes a UICC interface 45 which provides the physical interface to the UICC 5. In this embodiment, the UICC module 41 is a separate software module in the ME 3. As those skilled in the art will appreciate, in other embodiments, the UICC module 41 may be provided as part of the operating system 39.

As shown in FIG. 2, the UICC 5 includes an ME interface 51 for providing the physical interface to the ME 3. The UICC 5 also includes a processor 53 which operates in accordance with software instructions stored in memory 55. As shown, these software instructions include an operating system 56, a USAT module 57 (Universal SIM (subscriber Identity Module) Application Toolkit) and a number of applications 59. The USAT module 57 provides mechanisms that allow the UICC applications 59 to interact and operate with the ME 3 or a remote entity in the operator network 9 (or the Internet 15) which supports the specific mechanism(s) required by the UICC application 59.

As will be explained in more detail below, the USAT module 57 is programmed to generate a new proactive command (CONFIGURE) that causes the UICC module 41 to add, remove or update the ONP data 44. The ONP data 44 for each server is associated with an identifier so that in subsequent proactive commands, the USAT module 57 only needs to include the identifier for the desired access point 11, from which the UICC module 41 can retrieve the relevant access point ONP data 44 allowing the ME to connect to the desired access point 11.

Example Implementation

Figure 3:
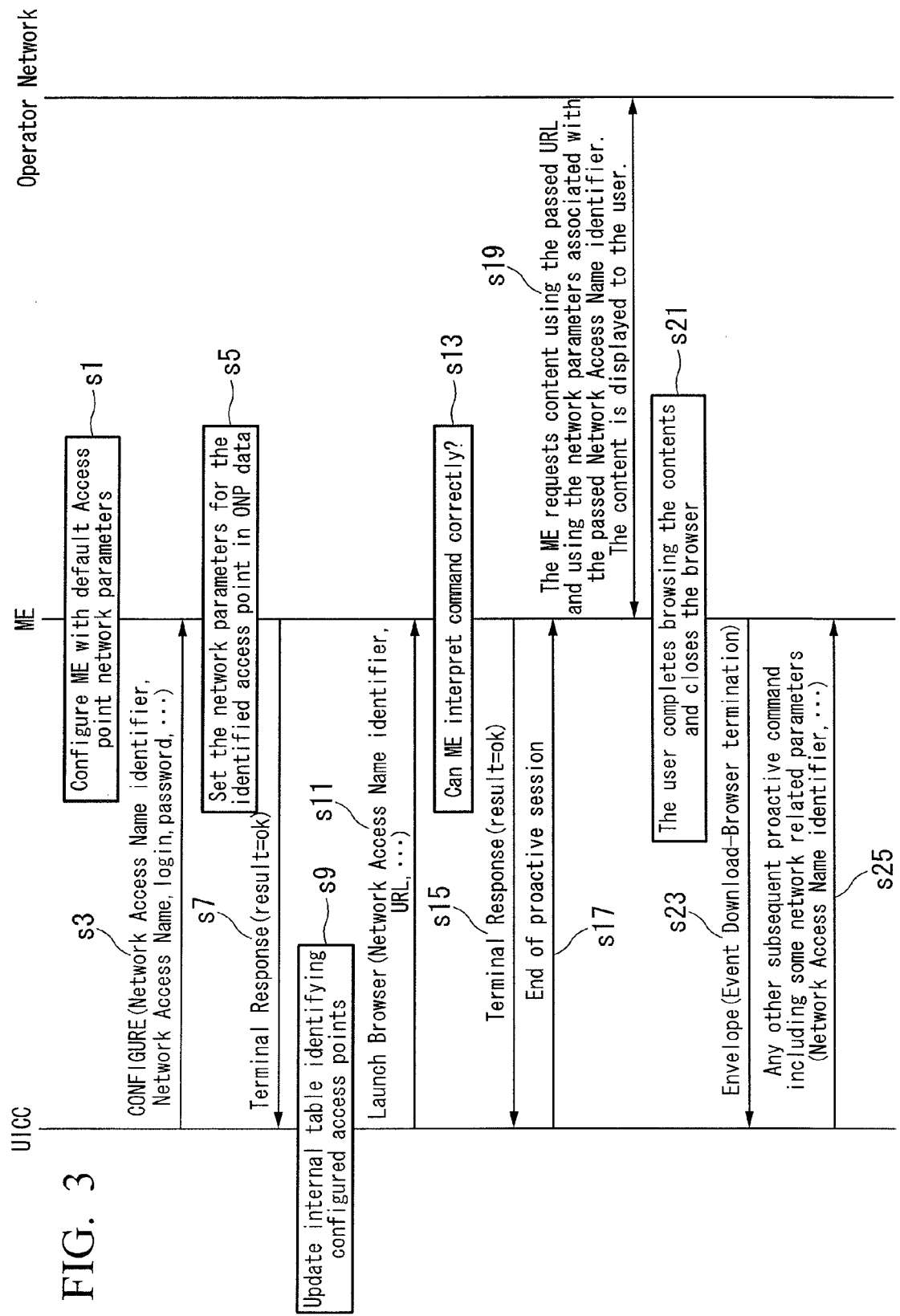
FIG. 3 is a communications timing diagram illustrating communications between the ME, the UICC and the operator network performed in a first embodiment.

FIG. 3 is a timing diagram illustrating the communications that may be made between the devices shown in FIG. 1 using this new CONFIGURE command. As shown, in step s1, the ME is configured with some default network parameters (default network access name with its associated login and password etc), which are stored as ONP data 44. Typically this configuration occurs prior to release of the ME to the market. This example will consider the case where the UICC applications 59 do not necessarily know what default access point is set in the ME 3 and where a UICC application seeks to connect to an access point which is different from the default one set in the ME 3. Thus in step s3, the USAT module 57 generates and passes the new CONFIGURE command (which defines the network parameters for a desired access point and an identifier (Network Access Name Identifier)) to the UICC module 41. (These new network parameters may be pre-stored within the UICC 5 as part of the UICC application 59 or they may have been downloaded to the UICC 5 by the network operator during a previous communication session.) In response to receiving this command, the UICC module 41 sets, in step s5, the network parameters for the identified access point 11 in the ONP data 44 and, in step s7, passes a Terminal Response message back to the USAT module 57 indicating that the configuration has been completed successfully. In response, the USAT module 57 updates, in step s9, an internal table (not shown) identifying the different access points 11 that have been configured in the ME 3 in this way (which is used by the UICC applications 59 to determine when it is necessary to use the new CONFIGURE command).

As the reconfigured ONP data is stored in non-volatile memory, from this point forward, UICC applications 59 (and even ME applications 43) wishing to establish a connection to an access point 11 that has been configured in the ME 3 in this way, only need to specify the identifier for the access point in subsequent proactive commands. Thus, for example, if one of the UICC applications 59 wishes to launch the ME's web browser, then, as illustrated in step s11, the USAT module 57 will generate and pass the Launch Browser command to the UICC module 41. The Launch Browser command is an existing command that instructs the ME to launch its web browser (not shown) and includes a URL for the desired network address. In this embodiment, the Launch Browser command is modified to include the Network Access Name Identifier for the desired access point 11. In step s13, the UICC module 41 determines whether or not it can interpret the content corresponding to the passed URL and if it can locate the network parameters for the desired access point 11 from the ONP data 44. In this case the UICC module 41 can and so generates, in step s15, a Terminal Response message indicating a positive result. In response, the USAT module 57 passes, in step s17, an end of proactive session message to the UICC module 41. In step s21 the ME 3 requests content using the passed URL and using the network parameters associated with the passed Network Access Name Identifier (retrieved from the ONP data 44). When received, the content is displayed to the user on the display 33. In step s21, the user completes browsing the contents and closes the browser. If the UICC 5 has subscribed to the Browser Termination event, then the UICC module 41 will inform the USAT module 57 when the browser is closed in step s23. As illustrated in step s25, in any subsequent proactive command requiring access to a desired access point 11, parameters like Network Access Name, login or password are no longer needed. Only the Network Access Name Identifier is needed.

CONFIGURE Command

The structure of the new CONFIGURE command generated by the USAT module 57 in this embodiment, is illustrated in the table below (the "clauses" referred to in the table are defined in ETSI standards document TS 102 223 Version 8.1.0, the contents of which are incorporated herein by reference):

| Description | Clause |
| --- | --- |
| Proactive UICC command Tag | 9.2 |
| Length | — |
| Command details | 8.6 |
| Device identities | 8.7 |
| Network access name identifier | 8.xx |
| Network access name | 8.70 |
| Text String (login) | 8.15 |
| Text String (password) | 8.15 |
| Bearer description | 8.52 |
| Alpha identifier | 8.2 |
| Icon identifier | 8.31 |

All of the parameters in the command except for "Command details" and "Network access name identifier" are already defined in TS 102 223 and are used without change. The "Command details" parameter is already defined in TS 102 223, but needs to be changed. The "Command details" parameter is the code used to identify the type of command to the UICC module 41. Thus it is the interpretation of the "Command details" parameter by the UICC module 41 that causes the UICC module 41 to use the other data contained in the command to reconfigure (update, add, remove . . . ) the ONP data 44.

TS 102 223 already defines the structure of "Command details" as follows:

| Byte(s) | Description | Length |
| --- | --- | --- |
| 1 | Command details tag | 1 |
| 2 | Length = '03' | 1 |
| 3 | Command number | 1 |
| 4 | Type of command | 1 |
| 5 | Command Qualifier | 1 |

A new "Type of command" has to be defined for this new CONFIGURE proactive command.

It is proposed to set it to the value '71', but any other available value could be used (existing values are defined in paragraph 9.4 of TS 102 223 v8.1.0).

The "Network access name identifier" is a new TLV data object to be added in TS 102 223:

8.xx Network Access Name Identifier

| Description |
| --- |
| Network access name identifier tag |
| Length |
| Data coding scheme |
| Network access name identifier |

It is proposed to define the "Network access name identifier" parameter in the table above as an alphanumeric string. The current proposal does not specify any particular format for the data coding, but as a possible implementation, the same data coding schemes (any one or all of them) as for the Text String data object (see clause 8.15 in TS 102 223) could be used, with the exception that the Network access name identifier tag has a specific value. An example value could be 0×80 but any other unused value could be used. In case a default data coding scheme is used (i.e. ETSI SCP decide to use one particular data coding scheme in order to simplify the implementation), the "Data coding scheme" parameter in the table above can be removed.

Thus this new CONFIGURE proactive command allows the UICC 5 to specify for one given network access point 11:
the identifier (Network access name identifier)
the name (Network access name)
the login
the password
the characteristics of the data bearer like the QoS parameters (Bearer description)

Upon receipt of this command, the UICC module 41 will read these network parameters from the command and store them in the ONP data 44. If the UICC module 41 subsequently receives another proactive command that includes the Network access name identifier, then the UICC module 41 will use the identifier to find the network parameters for that access point from the ONP data 44 so that it can use them to connect to that access point.

In addition, in order to allow a better usage of these network access points by both the UICC applications 59 and the ME applications 43, it is proposed to define a standard list of network access name identifiers (it is at least proposed to standardize one identifier for the default network access point, e.g. APDEFAULT). Some examples of identifiers are given below (list not exhaustive):
APDEFAULT: default network access point
APWEB: for Web applications
APDL: for UICC data download applications (e.g. download a game from the network)
APMMS: for MMS
APSEC: for high security required applications As a consequence of the usage of this new CONFIGURE proactive command, it is proposed to update the structures of the following existing proactive commands in order to benefit from the features provided by this new CONFIGURE command.

Launch Browser Proactive Command (Defined in TS 102 223)

| Description | Clause | M/O | Min | Length |
|---|---|---|---|---|
| Proactive UICC command Tag | 9.2 | M | Y | 1 |
| Length | — | M | Y | 1 or 2 |
| (A + B + C + D + E + F1 + F2 + . . . + FN + G + H + I + J + K + L) | | | | |
| Command details | 8.6 | M | Y | A |
| Device identities | 8.7 | M | Y | B |
| Browser identity | 8.47 | O | N | C |
| URL | 8.48 | M | Y | D |
| Bearer | 8.49 | O | N | E |
| Provisioning File Reference 1 | 8.50 | O | N | F1 |
| Provisioning File Reference 2 | 8.50 | O | N | F2 |
| . . . | 8.50 | O | N | Fx |
| Provisioning File Reference N | 8.50 | O | N | FN |
| Text String (Gateway/Proxy identity) | 8.15 | O | N | G |
| Alpha identifier (user confirmation phase) | 8.2 | O | N | H |
| Icon identifier (user confirmation phase) | 8.31 | O | N | I |
| Text Attribute | 8.72 | C | N | J |
| Frame identifier | 8.80 | O | N | K |
| Network access name identifier | 8.xx | O | N | L |

The Launch Browser command is updated with the addition of the new "Network access name identifier" TLV data object (as defined above).

Open Channel Proactive Command

TS 102 223 defines many forms of the Open Channel command. Each form is related to one particular bearer (CS, PS, local bearer, etc). It is also proposed here to add the new "Network access name identifier" TLV data object (as defined above) in each of these Open Channel commands. An example is given below for the Open Channel command related to the CS bearer:

OPEN CHANNEL Related to CS Bearer

| Description | Clause | M/O/C | Min | Length |
|---|---|---|---|---|
| Proactive UICC command Tag | 9.2 | M | Y | 1 |
| Length | — | M | Y | 1 or 2 |
| (A + B + C + D + E + F + G + H + I + J + K + L + M + N + O + P + Q + R) | | | | |
| Command details | 8.6 | M | Y | A |
| Device identities | 8.7 | M | Y | B |
| Alpha identifier | 8.2 | O | N | C |
| Icon identifier | 8.31 | O | N | D |
| Address | 8.1 | M | Y | E |
| Subaddress | 8.3 | O | N | F |
| Duration 1 | 8.8 | C | N | G |
| Duration 2 | 8.8 | O | N | H |
| Bearer description | 8.52 | M | Y | I |
| Buffer size | 8.55 | M | Y | J |
| Other address (local address) | 8.58 | O | N | K |
| Text String (User login) | 8.15 | O | N | L |
| Text String (User password) | 8.15 | O | N | M |
| UICC/terminal interface transport level | 8.59 | O | N | N |
| Data destination address | 8.58 | C | Y | O |
| Text Attribute | 8.72 | C | N | P |
| Frame identifier | 8.80 | O | N | Q |
| Network access name identifier | 8.xx | O | N | R |

Second Embodiment

Overview

Having developed the above embodiment, the inventor realized that the new CONFIGURE command could be used to reconfigure the ONP data 44 for the default access point in the event that the network operator changes the default access point. Indeed in a simpler embodiment where the ONP data 44 only includes data for the default access point 11, the new CONFIGURE command can be simplified by removing the Network Access Name Identifier parameter from the command. In this case, no changes would need to be made to the Launch Browser command or the Open Channel commands.

With this arrangement, if the operator network 9 changes the default access point 11 after the ME 3 has been released into the market, the network operator can cause the UICC 5 to generate and pass the new CONFIGURE command to the UICC module 41 to change the default parameters defined by the ONP data 44. As a result, the UICC 5 will not need to include the ONP data for the new default access point with every proactive command and the ME 3 will not need to analyze that ONP data in each proactive command.

Modified CONFIGURE Command

The structure of the simpler CONFIGURE command generated by the USAT module 57 in this embodiment, is illustrated in the table below (the "clauses" referred to in the table are as defined above):

| Description | Clause |
| --- | --- |
| Proactive UICC command Tag | 9.2 |
| Length | — |
| Command details | 8.6 |
| Device identities | 8.7 |
| Network access name | 8.yy |
| Text String (login) | 8.15 |
| Text String (password) | 8.15 |
| Bearer description | 8.52 |
| Alpha identifier | 8.2 |
| Icon identifier | 8.31 |

Example Implementation

Figure 4:
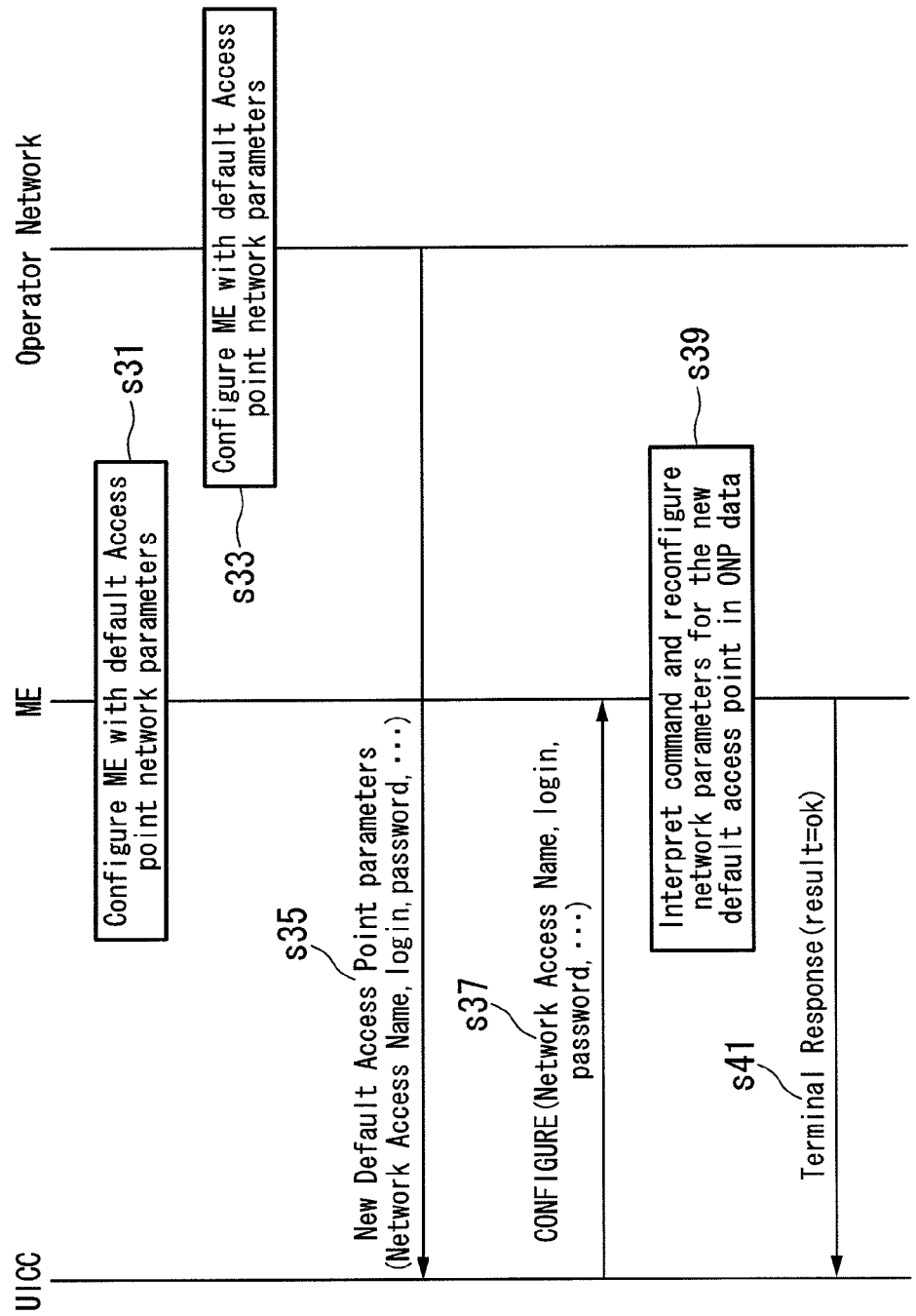
FIG. 4 is a communications timing diagram illustrating communications between the ME, the UICC and the operator network performed in a second embodiment.

FIG. 4 is a timing diagram illustrating the communications that may be made between the devices shown in FIG. 1 using this modified CONFIGURE command. As shown, in step s31, the ME 3 is initially configured with the default network parameters for the default access point 11, which the ME 3 stores as the ONP data 44. At some point in time after the ME is released into the market, the operator network 9 changes, in step s33, the default access point 11 and, in step s35, sends the UICC 5 new ONP data for the new access point 11. In response to receiving the new ONP data, the UICC 3 generates and passes, in step s37, the new CONFIGURE command to the ME 3 using the ONP data received from the operator network 9. Upon receipt of the command, in step s39, the ME 3 interprets the command and uses the new ONP data contained in the command to reconfigure the default access point network parameters stored in ONP data 44. The ME 3 then passes, in step s41, a Terminal Response message back to the UICC 5, to confirm that the change has been made. Thereafter the UICC 5 does not need to include any network parameters for the desired access point (provided the desired access point is the same as the default access point) when it wants to connect to the access point.

[Modifications and Alternatives]

Detailed embodiments have been described above. As those skilled in the art will appreciate, a number of modifications and alternatives can be made to the above embodiments whilst still benefiting from the inventions embodied therein.

In the above embodiments, a mobile telephone based telecommunications system was described. As those skilled in the art will appreciate, the techniques described in the present application can be employed in other communications system. Other communications nodes or devices may include user devices such as, for example, personal digital assistants, portable telephones, laptop computers etc.

As those skilled in the art will appreciate, the new CONFIGURE command described above sets the parameters for one network access point at a time. If the UICC 5 wants to configure several access points, it has to call the command several times. In an alternative embodiment, however, a more complex command may be defined that allows the UICC 5 to configure several access points in each command.

In the above embodiments, a number of software modules were described. As those skilled will appreciate, the software modules may be provided in compiled or un-compiled form and may be supplied to the UICC or to the ME as a signal over a computer network, or on a recording medium. Further, the functionality performed by part or all of this software may be performed using one or more dedicated hardware circuits. However, the use of software modules is preferred as it facilitates the updating of the UICC 5 and of the MEs 3 in order to update their functionalities.

In the above embodiment, the UICC interfaced with the ME via respective interfaces on each device. As those skilled in the art will appreciate, these interfaces may be physical (contact) type interfaces or they may by wireless (non-contact) type interfaces.

It is also to be noted that the solution could be extended in order to be applicable over the USB EEM (Ethernet Emulation Mode) interface class. The way in which in this would be achieved will be apparent to those skilled in the art and so a detailed description will not be given here.

In the above embodiments, the UICC was able to reconfigure the network parameters for an existing access point. Such reconfiguration may be performed when the network operator uses a new access point or when it just updates some parameters of an existing access point. Various other modifications will be apparent to those skilled in the art and will not be described in further detail here.

A program may cause the UICC and/or ME to execute a process of configuring network operator related parameters.

A program for implementing the functions of the UICC and/or ME may be recorded in a computer-readable recording medium. The program recorded on the recording medium may be read into a computer system and the UICC and/or ME may execute a process of configuring network operator related parameters.

The computer system used herein includes hardware, such as an OS and peripheral devices.

The computer system may also include a homepage providing environment (or a display environment) so long as such an environment utilizes a WWW system.

Examples of the computer-readable recording medium include a portable medium, such as a flexible disc, a magneto-optical disc, a ROM and a CD-ROM and a storage device, such as hard disk incorporated in the computer system. Examples of the computer-readable recording medium include a medium which dynamically holds a program for a short time. Such a medium includes a communication line for transmitting a program via a communication line, such as a network, like the Internet, and a telephone line. Examples of the computer-readable recording medium may also include a medium which holds the program for a certain period of time to implement the communication described above. Such a medium may include a volatile memory incorporated in the computer system used as a server or a client. The above-described program may implement only part of the above-described functions. The above-described functions may be implemented in combination with programs previously recorded in the computer system.

INDUSTRIAL APPLICABILITY

The present invention can be applied to communications equipment and in particular to mobile equipment (ME) having a UICC therein and the way in which software applications can run on the UICC and interact with the ME so as to provide more flexibility for operator applications residing in the UICC and to reduce the processing of all network related proactive commands in both the UICC and the ME.

The invention claimed is:

1. A mobile device comprising:
a Universal Integrated Circuit Card (UICC) interface for interfacing with a UICC; a memory for storing network access data for use in connecting to a remote access point;
a UICC module operable to communicate with said UICC via said UICC interface; and transceiver circuitry operable to transmit and receive signals for connecting to said remote access point using said stored network access data;

wherein said UICC module is operable to receive a configure command from said UICC via said UICC interface, the configure command including new network access data for a remote access point and wherein the UICC module is operable, in response to receiving said configure command, to store the new network access data in said memory for use in connecting to the remote access point corresponding to the new network access data;

wherein the UICC module is operable to store the new network access data in said memory in addition to existing network access data;

wherein the new network access data includes login data and a unique identifier for distinguishing the new network access data from other network access data stored in said memory; and wherein the UICC module is operable to receive a further command from the UICC via said UICC interface, the further command requiring access to the network;

in response to receiving said further command, the UICC module is operable to retrieve the stored network access data from said memory so that a connection to the remote access point associated with the stored network access data can be established;

said further command includes the identifier without the login data; and the UICC module is operable to use the identifier to retrieve the corresponding login data from said memory.

2. A device according to claim 1, wherein said network access data is stored in a non-volatile portion of memory.

3. A device according to claim 1, wherein the UICC module is operable to store the new network access data in said memory in place of existing network access data.

4. A devices according to claim 1, wherein the UICC module is operable to receive a further command from the UICC via said UICC interface, the further command requiring access to the network; and wherein, in response to receiving said further command, the UICC module is operable to retrieve the stored network access data from said memory so that a connection to the remote access point associated with the stored network access data can be established.

5. A device according to claim 4, wherein said further command is a Launch Browser command or an Open Channel command.

6. A Universal Integrated Circuit Card (UICC) comprising:
an interface for interfacing with a mobile device;
a memory for storing network access data for use by the mobile device to connect to a remote access point; and
a Universal SIM (subscriber Identity Module) Application Toolkit (USAT) module operable to communicate with the mobile device; wherein the USAT module is operable to generate a configure command including the stored network access data and to pass the generated configure command to the mobile device and wherein the configure command s different from any command used to request a connection to a remote access point and is for causing the mobile device to store the network access data for use in connecting to a remote access point in response to a subsequent command generated by the USAT module;
Wherein the USAT module is operable to generate a configure command that includes login data for the remote access point and an identifier associated with the access point; and
wherein the USAT module is operable to generate a further command and to pass the generated further command to the mobile device, the further command requiring access to the network and including the identifier without the login data.

7. A UICC according to claim 6, wherein the USAT module is operable to maintain information identifying the access points for which the network access point data has been sent in one or more configure commands to the mobile device.

8. A UICC according to claim 7, wherein the USAT module is operable to check the maintained information before generating a configure command for new network access data, and only generates the configure command if the network access data has not already been passed to the mobile device for storage therein.

9. A UICC according to claim 6, wherein said further command is a Launch Browser command or an Open Channel command.

10. A method performed in a mobile device, the method comprising: holding in memory network access data for use in connecting to a remote access point;
receiving a configure command from a Universal Integrated Circuit Card (UICC) associated with the mobile device, the configure command including new network access data for a remote access point; and
storing the new network access data in said memory for use in connecting to the remote access point corresponding to the new network access data;
wherein storing stores the new network access data in said memory in addition to existing network access data;
wherein the new network access data includes login data and a unique identifier for distinguishing the new network access data from other network access data stored in said memory; and
receiving a further command from the UICC, the further command requiring access to the network; wherein, in response to receiving said further command, retrieving the stored network access data from said memory so that a connection to the remote access point associated with the stored network data can be established;
wherein said further command includes the identifier without the login data and wherein said retrieving uses the identifier to retrieve the corresponding login data from said memory.

11. A method according to claim 10, wherein said storing stores said network access data in a non-volatile portion of memory.

12. A method according to claim 10, wherein storing stores the new network access data in said memory in place of existing network access data.

* * * * *

UNITED STATES PATENT AND TRADEMARK OFFICE
CERTIFICATE OF CORRECTION

PATENT NO. : 8,489,143 B2  Page 1 of 1
APPLICATION NO. : 13/148434
DATED : July 16, 2013
INVENTOR(S) : Olivier Dong It is certified that error appears in the above-identified patent and that said Letters Patent is hereby corrected as shown below:

In the Claims

Column 11, Line 55: In Claim 6, delete "command s" and insert -- command is --

Column 12, Line 4: In Claim 6, delete "Wherein" and insert -- wherein --

Column 12, Line 42: In Claim 10, after "network;" insert -- and --

Column 12, Line 46: In Claim 10, after "network;" insert -- access --

Signed and Sealed this
Twenty-eighth Day of October, 2014

Michelle K. Lee
*Deputy Director of the United States Patent and Trademark Office*